(No Model.)
M. M. FAVOR.
SHAFT SUPPORTING DEVICE FOR VEHICLES.
No. 585,194. Patented June 29, 1897.
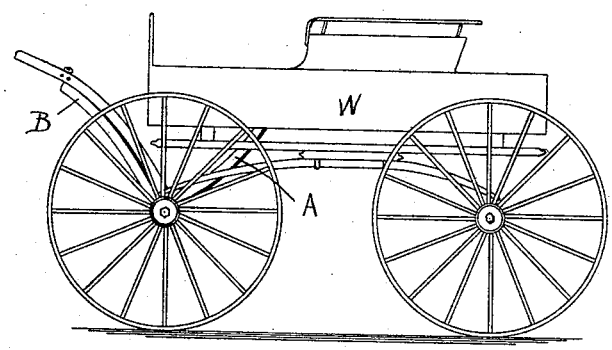
Fig. 1.
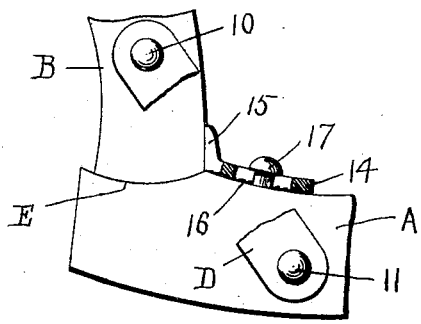 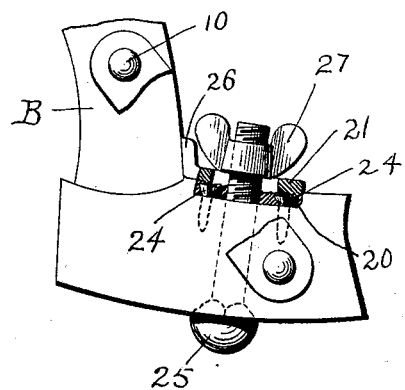
Fig. 2. Fig. 3.
Witnesses.
W. J. Baldwin
H. L. Abbott
Inventor.
M. M. Favor.
By Southgate & Southgate
Attorneys.

UNITED STATES PATENT OFFICE.

MILTON M. FAVOR, OF GARDNER, MASSACHUSETTS.

SHAFT-SUPPORTING DEVICE FOR VEHICLES.

SPECIFICATION forming part of Letters Patent No. 585,194, dated June 29, 1897.

Application filed July 2, 1896. Serial No. 597,837. (No model.)

*To all whom it may concern:*

Be it known that I, MILTON M. FAVOR, a citizen of the United States, residing at Gardner, in the county of Worcester and State of Massachusetts, have invented a new and useful Improvement in Shaft-Supporting Devices, of which the following is a specification.

The aim of this invention is to provide a strong and simple shaft-supporter for holding up the shafts of a vehicle when the same are not used, and to provide a device of this character which shall be very easy of manufacture and which may be very readily adjusted to fit different kinds of wagons or carriages.

To this end my invention consists of the devices described and claimed in this specification and illustrated in the accompanying drawings, referring to which—

Figure 1 is a side elevation of a wagon, the shafts thereof being held up by my device. Fig. 2 is an enlarged detail view illustrating the manner in which the arms of my device are connected and held in position, and Fig. 3 is a similar view illustrating a slightly-modified form of stop.

A shaft-supporter constructed according to my invention consists of two arms which are usually made of slightly-curved shape and of wood. These arms are connected together by means of two links, which links are pivoted to each of said arms, and a locking-stop is provided for holding said arms at substantially right angles with each other. By this construction my device can be inserted in place in the vehicle to rest on the front axle or springs and to have one end thereof support the shafts in a raised position and to have the other end strike on the bottom of the vehicle-body. Also it will be seen that my device can be folded up, so that the same can be put out of the way and occupy very little space, and that it may be adjusted by simply adjusting the locking-stop.

Referring to the drawings and in detail, W represents a wagon with my device in place therein holding the shafts in a raised position.

My device consists of two arms A and B, which are generally made of a somewhat curved shape, as shown. The two arms A and B are connected together by means of two links C and D, which are arranged on the sides thereof. The links are secured to the arms A and B by means of rivets or bolts 10 and 11, as shown, which pass through the arms A and B. One of the arms, as A, has a curved face E, which is cut away substantially about the center of the rivet or bolt 10, so that when the arms are in their operative position, substantially at right angles to each other, the arm B will nicely rest and be supported by this curved face E of the arm A.

One form of locking-stop is shown in Fig. 2. In this case the same consists of a slotted piece of metal 14, which has an upturned bearing-face 15, and teeth 16 on the bottom thereof. A screw 17 is passed through the slot and screwed into the arm A, and thus by loosening the screw and adjusting the piece 14 the locking-stop can be set to various positions.

In Fig. 3 I have shown a locking-stop made of two pieces, as 20 and 21, having engaging teeth. The piece 20 is secured to the arm A by means of screws 24. The piece 21 is slotted, and passing up through the piece 20 and the slot of the piece 21 is a bolt 25, onto which is threaded a butterfly-nut 27. By loosening the nut 27 the piece 21, which has an engaging face 26 for the arm B, can be adjusted on the piece 20.

An especial feature of my construction is its strength, the arms being supported by a link on each side and not being slotted or cut into at their ends, as is the case with ordinary constructions.

My device may also be folded into very small compass and is simple and easy of manufacture, as the arms A and B do not have to be slotted or cut out in any way.

The device herein described may be varied by a skilled mechanic without departing from the scope of my invention as expressed in the claim.

Having thus fully described my invention, what I claim, and desire to secure by Letters Patent of the United States, is—

In a device of the class described, the combination of a wooden arm B having a curved or rounded end, a wooden arm A having a corresponding socket or seat E, metallic connecting-links C and D, bolts or rivets 10 and 11 for pivoting the links to the arms B and A respectively, and an adjustable locking-stop mounted on the arm A, and comprising a longitudinally-slotted plate having teeth on its under side, and a screw or bolt for fastening the same in place, substantially as described.

In testimony whereof I have hereunto set my hand in the presence of two subscribing witnesses.

MILTON M. FAVOR.

Witnesses:
GEORGE BROWN,
LOUIS W. SOUTHGATE.